July 13, 1926.
L. S. HAMER
VALVE
Filed July 30, 1925
1,592,267
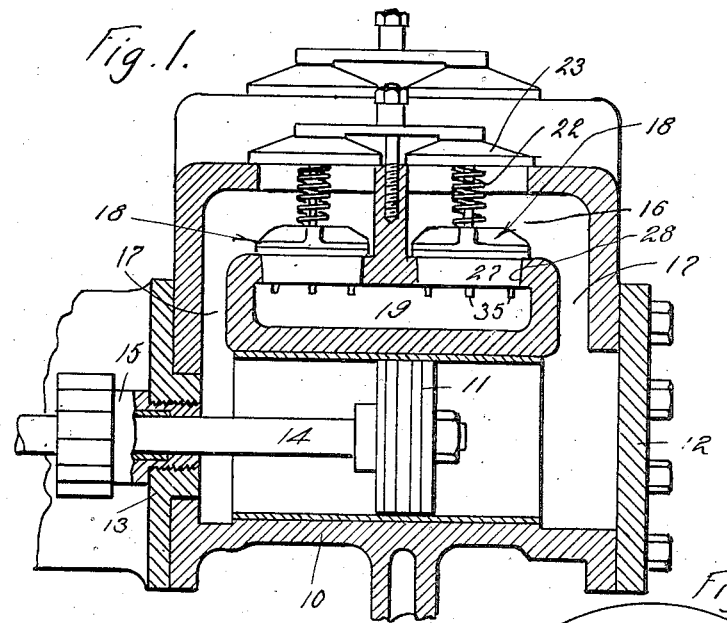
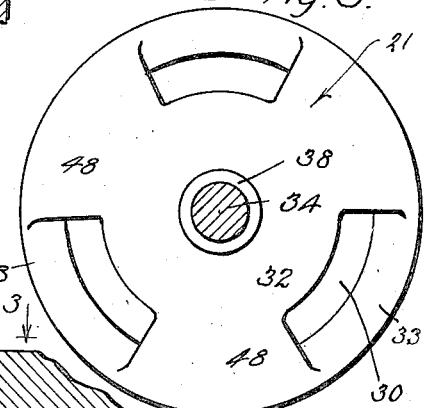
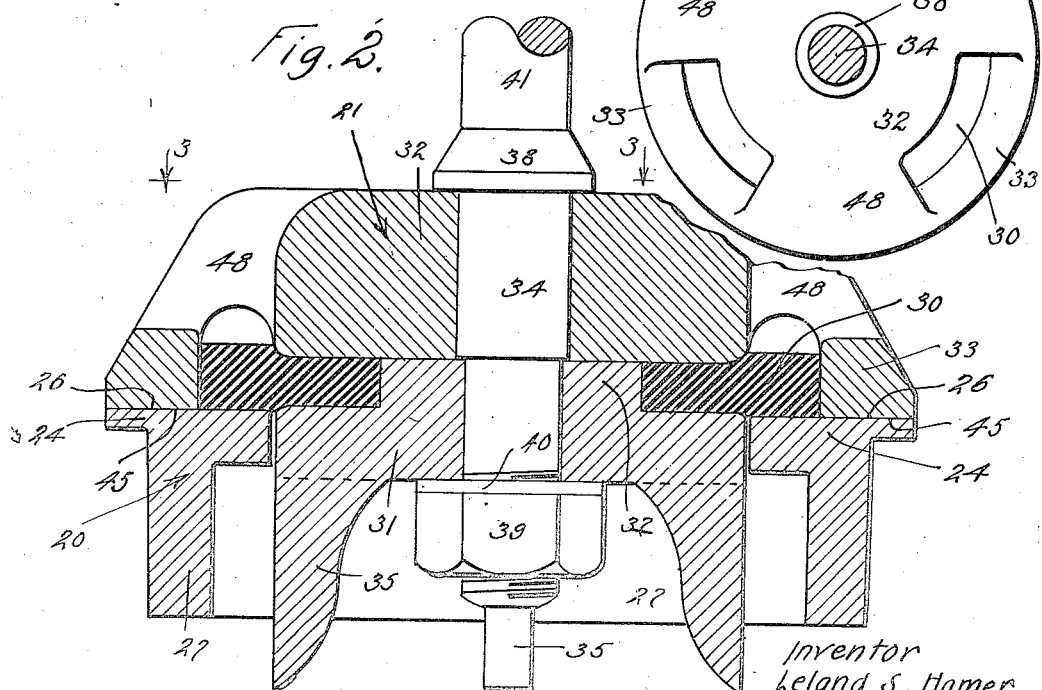
Inventor
Leland S. Hamer
by his Attorney Patented July 13, 1926.

1,592,267

UNITED STATES PATENT OFFICE.

LELAND S. HAMER, OF FULLERTON, CALIFORNIA.

VALVE.

Application filed July 30, 1925. Serial No. 46,988.

This invention has to do with a valve, and has particular reference to a pump valve, for instance, a valve for a slush pump, or the like.

It is a general object of this invention to provide an efficient, improved and economical valve of this general character.

Valves ordinarily employed in slush pumps, and the like, are of the poppet type and are made tight by means of rubber packing, or the like. In ordinary valves of this class the packing is comparatively large and the construction is such that all, or practically all, of the load carried by the valve comes upon the packing. Further, these valves are usually such as to wear comparatively fast.

It is an object of this invention to provide a valve having comparatively large, durable wearing parts.

It is another object of this invention to provide a valve in which only enough pressure comes upon the packing to properly seal it and in which the packing is comparatively small.

A further object of this invention is to provide a valve with large and strong wearing parts and which is at the same time comparatively light and inexpensive of construction.

The various objects and features of my invention will be best and more fully understood from the following detailed description of a typical form of the invention through which description reference is had to the accompanying drawings in which Fig. 1 is a fragmentary sectional view of a slush pump showing the intake valves of the pump.

Fig. 2 is an enlarged detailed sectional view of one of the valves showing in detail the construction provided by this invention, and Fig. 3 is a reduced plan view of the valve taken as indicated by line 3—3 on Fig. 2.

The valve provided by this invention is applicable to various classes of machinery. It is particularly suited for use in slush pumps, and the like, so therefore I will in this disclosure set forth a form of the invention particularly suited to a slush pump. To facilitate a full understanding of the invention I have shown in Fig. 1 of the drawings a more or less common form of slush pump and have shown the pump provided with valves embodying the present invention. The pump comprises, generally, a cylinder 10, a piston 11 arranged in the cylinder, heads 12 and 13 at the ends of the cylinder, a piston rod 14 entering the cylinder through a packing gland 15 in one of the heads and attached to the piston, a valve chest 16 connected to the heads of the cylinder by suitable ports 17, valves 18 in the valve chest, and various other parts usual to mechanisms of this character. In Fig. 1 of the drawings I have shown in detail the intake valves of the pump which control the flow from the intake chamber 19 of the valve chest to the ports 17 connected with the ends of the cylinder.

Each valve comprises, generally, a seat 20 mounted stationary in the valve chest of the pump and a movable part or valve proper 21. The movable part of the valve is normally held closed, or in seating engagement with the seat, by means of a spring 22 arranged between the valve part 21 and a removable cover plate 23. The arrangement and construction thus far described are common pumps of the types mentioned.

This invention is concerned particularly with the construction of the valve regardless of the particular use to which it is put and of the particular type of mechanism in which it may be embodied. In accordance with this invention the seat 20 includes an annular top 24 which is comparatively thin and wide. The upper side of the top is preferably flat and finished to form a seat or face 26 to receive the movable part of the device as hereinafter described. The seat is mounted in the valve chamber of the pump by means of a flange 27 which extends downwardly from the under side of the top 24 to fit the opening 28 in the valve chest. The flange 27 joins the top 24 at a point between the inner and outer edges of the latter and is finished to tightly fit the opening in the valve chest. With this construction the outer edge portion of the top 24 extends outwardly beyond, or over hangs, the flange 27 and serves to limit the amount flange can be forced into the opening in the valve chest while the inner edge portion of the top extends inwardly beyond, or over-hangs, the flange, and operates to hold the valve part 21 away from the flange and thus minimizes the contacting area between the valve and seat and reduces the liability of the valve binding in the seat. The seat which I have provided may be cast or otherwise formed as a unit and with my construction the seat is comparatively light and inexpensive to finish.

The valve proper includes, generally, a body or ring of packing 30 and a rigid body which carries the packing, a supporting ring 33 and a bolt 34 which holds the body together, the body including two separable sections 31 and 32. The section 31 is the lower section of the valve and is in the form of a disc which will freely fit or pass through the top 24 of the seat. The section 31 is provided with a plurality of downwardly extending guide fingers 35 which operate to guide the valve 21 in the seat. On the upper side of the section 31 there is an annular projection 37 around which the ring of packing 30 fits. The top section 32 of the body is in the form of a disc slightly smaller in diameter than the section 31. The periphery portion of the top section 32 engages the packing 30 so that the packing is held between the two sections. The bolt 34 extends through the center of the two sections and operates to clamp and hold them together so that they hold the packing tightly. The projection 37 limits the amount the sections can be moved together. The bolt is arranged through the sections so that it is tight in the upper section and its head 38 engages the upper section. The nut 39 engages the lower section through a suitable lock washer 40. A stem 41 extends upwardly from head 38 of the bolt, forming a guide or carrier for the spring 22.

The packing 30 is in the form of a flat annular body the inner edge portion of which is clamped tightly between the upper and lower sections 31 and 32 in the manner just described. The outer portion of the packing ring projects beyond the sections and is adapted to engage the inner portion of the seat or face 26. By this construction the outer edge or periphery portion of the packing ring engages the seat 26 and receives pressure so that it is held tightly against the seat.

The supporting ring 33 provided by this invention is located around or on the outside of the packing ring 30 and is provided at its lower side with a flat face 45 adapted to engage and occupy the outer portion of the face 26 not covered or occupied by the packing 30. The supporting ring is, as will be seen from inspection of the drawings, comparatively large in diameter and the seat 45 is comparatively wide so that the ring has a comparatively large area engaging the face 26. The supporting ring 30 is rigidly connected with the body, it being preferred to connect it with the upper section 32 of the body by means of spaced ribs 48. These ribs 48 are designed and proportioned so that they do not engage or interfere with the operation of the packing and so that they effectively and rigidly connect the top section 32 and ring 33.

From the foregoing description it will be apparent that the load or pressure coming upon the valve will be supported by or through the supporting ring 33. Any load or strain coming on the section 31 is transmitted or communicated to the top section 32 through the bolt 34 and the load or strain coming on the top section 32 is transmitted or communicated through the ribs 48 to the supporting ring 33. The supporting ring 33 directly engages the stationary seat and because of its comparatively wide face 45 and large diameter it has a large wearing area, making it particularly durable. The outer or periphery portion of the packing 30 is free so that it engages the inner portion of the face 26 and is exposed to the pressure coming on the valve. The pressure coming on the periphery portion of the packing forces it down and holds it tightly against the inner portion of the seat 26 making a fluid-tight joint between the seat 20 and valve 21.

It is to be particularly noted that the rubber or packing 30 is comparatively small in diameter and therefore inexpensive, that the load supporting parts are comparatively large, therefore effective and durable, that the packing does not support the valve but only receives pressure which operates to hold it in engagement with the seat, that the guide fingers 55 on the lower section 33 will operate in or through the top 24 with very little friction or resistance and that the construction is comparatively simple, light and inexpensive.

Having described only a typical preferred form of my invention I do not wish to limit myself to the specific details set forth, but wish to reserve to myself any changes or variations that may appear to those skilled in the art or fall within the scope of the following claims.

Having described my invention, I claim:

1. In combination a seat with a flat annular top and a mounting flange extending downwardly from the under side of the top so that the inner and outer portions of the top overhang the flange, and a valve including a body with guide parts slidably carried in the top, a load supporting ring adapted to engage the outer portion of the top, ribs rigidly connecting the ring and body, and packing carried by the body adapted to engage the inner portion of the top.

2. In combination a seat having a flat annular top, and a valve including a body comprising two sections and a bolt connecting the sections, a packing ring clamped between the sections so that it projects from the body to engage the inner portion of the top, a load supporting ring around the packing and adapted to engage the outer portion of the top, and a plurality of spaced ribs rigidly connecting the supporting ring and body and spaced above the packing.

In witness that I claim the foregoing I have hereunto subscribed my name this 15 day of July 1925.

LELAND S. HAMER.